(12) United States Patent
Patti et al.

(10) Patent No.: US 8,474,000 B2
(45) Date of Patent: Jun. 25, 2013

(54) MANAGING UPSTREAM BANDWIDTH

(75) Inventors: Andrew J. Patti, Cupertino, CA (US); Wai-Tian Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 292 days.

(21) Appl. No.: 12/858,352

(22) Filed: Aug. 17, 2010

(65) Prior Publication Data

US 2012/0047547 A1 Feb. 23, 2012

(51) Int. Cl.
*H04N 7/173* (2011.01)

(52) U.S. Cl.
USPC .......................... 725/127; 725/116; 709/219

(58) Field of Classification Search
USPC .................. 725/91–127; 709/217–232
See application file for complete search history.

(56) References Cited

U.S. PATENT DOCUMENTS

| | | | | |
|---|---|---|---|---|
| 7,633,869 | B1 * | 12/2009 | Morris et al. | 370/232 |
| 7,693,190 | B2 * | 4/2010 | Firestone et al. | 370/503 |
| 2008/0271069 | A1 | 12/2002 | Kim et al. | |
| 2006/0062209 | A1 * | 3/2006 | Riley | 370/352 |
| 2007/0177626 | A1 | 8/2007 | Kotelba | |
| 2009/0185625 | A1 | 10/2008 | Lee et al. | |
| 2009/0058986 | A1 * | 3/2009 | Beers et al. | 348/14.08 |
| 2010/0080287 | A1 * | 4/2010 | Ali | 375/240.03 |

FOREIGN PATENT DOCUMENTS

KR 10-0686635 2/2007

OTHER PUBLICATIONS

Co-Pending Application~Int'l Application No. PCT/US2009/055508 filed Aug. 31, 2009~HP Patent reference No. 200902331-1.
PCT Search Report/Written Opinion~Int'l Application No. PCT/US2009/055508 filed Aug. 31, 2009 (co-pending application).
N Baldol et al; "RTCP Feedback Based Transmission Rate Control for 3G Wireless Mulltimedia Streaming"~PIMRC 15th IEEE Int'l Symposium Sep. 2004 v3:1817-1821.
Sunghoon Son~"A Transmission Scheme for Streaming Variable Bit Rate Video Over Internet"~Springer-Verlag 2001 (Berlin)~pp. 16-28.
Cisco Systems, Inc~"Cisco TelePresence System 1100"~Publication Date 2010~7 pages.
Erbad et al~"Paceline: Latency Management Through Adaptive Output"~MMSYS '10~Feb. 2010~pp. 181-192.

* cited by examiner

*Primary Examiner* — Annan Shang

(57) ABSTRACT

A computer-implemented method for managing upstream bandwidth of a network including changing QoS settings, by a router, of a video device of a plurality of video devices in the network to a higher priority than other of the plurality of video devices. The plurality of video devices concurrently transmit video data. The computer-implemented method further includes estimating an overall upstream bandwidth by the higher priority video device and determining operating rates, by the router, for the plurality of video devices, such that said modem buffer is not backlogged.

15 Claims, 3 Drawing Sheets

MANAGING UPSTREAM BANDWIDTH

BACKGROUND

In a network, a router must limit its output rate to be just below the achievable modem upstream rate. Failure to do so will cause delay, or even buffer trail drops (i.e., packet loss), which effects time-critical data, such as video packets. Many throughput measurement techniques have attempted to cure such delay and/or packet loss.

Throughput measurement techniques rely on the ability to send multi-packet bursts and monitor feedback regarding their reception. However, when there are multiple video sources generating upstream traffic, typical QoS policy is to treat all the video streams with the same priority. As a result, packet bursts from each video source will often be interleaved. Thus, estimates of the actual upstream throughput are unreliable.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

In a small-office/home-office (SOHO) environment, high-definition (HD), low-latency video conferencing is an essential collaboration tool. However, due to upstream network limitations, SOHO networks (e.g., cable modem and Digital Subscriber Line (DSL)) are often the limiting factor in achieving the necessary video quality. Typically, the upstream throughput is limited, not pre-provisioned or pre-determined, and may vary. Further, buffering elements may introduce delay and packet loss. Prior solutions have not done an adequate job enabling the required network adaption and quality-of-service (QoS) when there are multiple video sources generating upstream traffic (e.g., multiple simultaneous video conferences, or multiple participants in the same video conference).

In general, the discussion provided below describes, in various embodiments, a router actively arranging different video QoS settings to enable effective upstream network rate estimation. In particular, video devices do not necessarily behave differently due to intra video class QoS distinction. Also, actual bandwidth measurements occur at the router and/or video devices and possibly with an accompanying (e.g., behind the router on the local network) QoS protocol. Note that "bandwidth" and "bit-rate" are used synonymously hereafter.

Figure 1:
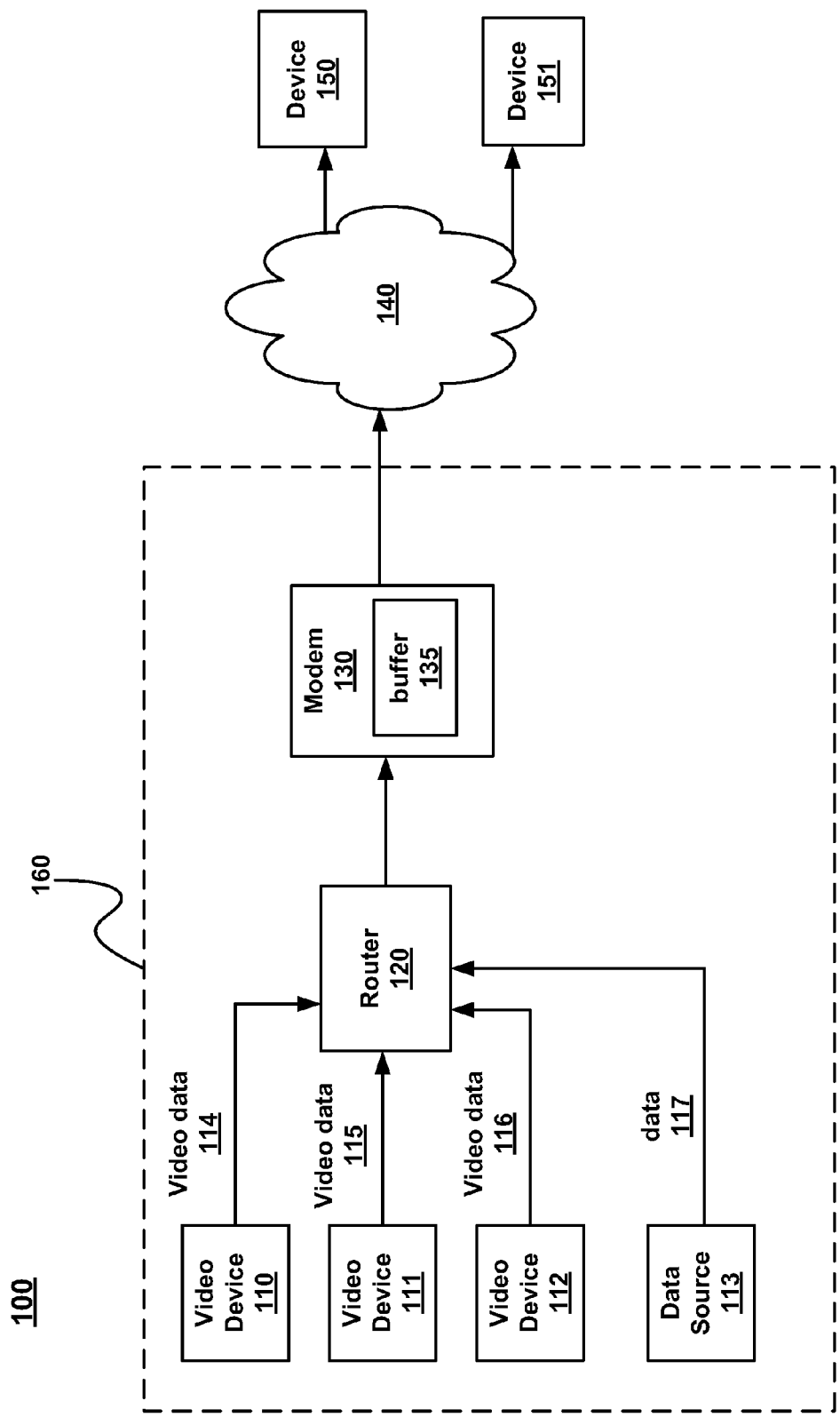
FIG. 1 illustrates an example of a network, in accordance with an embodiment of the present invention.

FIG. 1 depicts a network 100 in accordance to an embodiment of the present invention. Network 100 includes video devices 110-112, data source 113 router 120 and modem 130. For purposes of clarity and brevity, FIG. 1 depicts upstream flow of data in network 100. For example, data (e.g., video data 114) flowing through router 120 and modem 130. It should be appreciated that network 100 also enables data to flow in the direction of modem 130 through router 120 and to an end point (e.g., video devices 110-112). In one embodiment, network 100 includes a local network 160 (e.g., SOHO environment).

Video devices 110-112 are configured to generate and transmit video data 114-116, respectively. Typically, video data is transmitted to a device(s) 150 and 151 via router 120, modem 130 and internet 140.

In one embodiment, video data 114-116 is HD video data. In particular, video devices 110-112 concurrently generate video data 114-116, respectively.

Video devices 110-112 can be any device that produces video data. For example, video devices 110-112 are selected from the group consisting of: laptops, desk tops, personal digital assistant (PDAs), teleconferencing systems, visual-collaborative systems and the like. FIG. 1 depicts three video devices 110-112, however, local network 160 can include any number of video devices (at least two).

Data source 113 is configured to store data and transmit data 117 (e.g., non-time sensitive digital images). For example, data source 113 may upload web pages to device 150, which is a web server. FIG. 1 depicts single data source 113, however, local network 160 can include any number of data sources. In various embodiments, data source 113 can be, but is not limited to, a desktop computer or a laptop computer. In one embodiment, data source 113 is located in the same physical device as a video source, e.g., a browser in a computer running a video conferencing application.

Router 120 is configured to actively arrange different video QoS settings to enable effective upstream network rate estimation. In one embodiment, router 120 is a QoS router. Router 120 is also configured to receive data from video devices 110-112 and data source 113.

Modem 130 is configured to receive data from video devices 110-112 and data source 113 via router 120. Modem 130 includes buffer 135. In one embodiment, the received data can be temporarily stored in buffer 135 until the data is removed, in a first in first output manner, and transmitted to device(s) 150 and 151.

Promotion of a Single Video Device to a Higher QoS Setting

In various embodiments, router 120 implements a control protocol built on a standard, reliable protocol (e.g., TCP) that video devices 110-112 use to coordinate with router 120. Video devices 110-112 inform router 120 that they intend to generate video data 114-116, respectively, and at what rate they would prefer to transmit video data 114-116. Video devices 110-112 provide enough information for router 120 to identify the stream of video data (e.g., destination IP address and port).

To enable one of the video devices to reliably estimate the overall upstream bandwidth, router 120 promotes one of the video devices to a higher QoS setting than the others. For example, router 120 promotes video device 110 to a higher QoS setting than video devices 111 and 112 (e.g., strict priority). As a result, router 120 subsequently ensures that video data 114 (e.g., video data packets) sent by video device 110 (especially when sent in a burst) are not interleaved with data (video data or otherwise) from other sources. In particular, if a first video data packet and a second video data packet are transmitted back-to-back in video data 114, then router 120 will ensure that the modem 130 receives the first video packet and the second video packet back-to-back without video data from any video data sources interleaved between them.

In contrast, in conventional networks, video data transmitted concurrently from a plurality of video devices can be interleaved with one another. As a result, the estimated upstream bandwidth may be estimated smaller than it actually is.

In one embodiment, each of video devices 110-112 periodically informs router 120 an estimated upstream bandwidth. In particular, the video device with a higher QoS setting (e.g., video device 110) transmits its estimated upstream bandwidth to router 120. Router 120 uses the estimated upstream bandwidth from the video device with a higher QoS setting to: (1) control the overall upstream bandwidth for both non-time critical data (e.g., data 117) and video packets to be just lower than the estimated upstream bandwidth. This avoids backlog modem buffer 135; and (2) determine actual video rates each endpoint should use (in a fair manner) and communicates this rate to each video device.

For example, if the estimated upstream bandwidth from the video device with a higher QoS is 3 megabits per second (Mbps), then router 120 can determine that video devices 110-112 should transmit video data 114-116, respectively at 0.8 Mbps and data source 113 transmit data 117 at 0.2 Mbps. It should be appreciated that router 120 can simply restrict the aggregate rate of all data sources to a determined bandwidth. It is not required for router 120 to inform or seek cooperation from each data source about their respective rate usage.

It should be appreciated there are a variety of methods by which router 120 can determine at what rates each video device should operate. Further, router 120 utilizes standard networking tools to achieve the QoS treatment. Moreover, router 120 does not require active estimation of upstream bandwidth, but relies on estimates of video devices 110-112, as described above.

Round-Robin Modulation

In various embodiments, router 120 determines a round-robin modulation to promote each of the video devices to a slightly higher QoS setting than the others. In other words, each video device has a turn to having a higher QoS setting. As a result, each video device generates a reliable estimate of the overall upstream bandwidth during the time it has the higher QoS setting. In one embodiment, the estimated upstream rate is taken as the largest estimate from all video devices. In another embodiment, median filtering is applied to remove extreme estimates.

The round-robin modulation can be utilized when video devices 110-112 are communicating with device(s) 150-151 on a poor network connection, which yields unreliable estimate of the local upstream bandwidth available to router 120.

For example, if there is a poor connection between video device 110 and device 150, an unreliable estimate of the local upstream bandwidth can be lower than the actual bandwidth. In one embodiment, a better estimate from one of video device 111 or 112 can be utilized by simply using the maximum available bandwidth estimate from all the video devices. In another embodiment, median filtering is applied.

Round-Robin Modulation and Determination of Available Upstream Bandwidth by Router In general, this determination of available upstream bandwidth enables router 120 to operate without a control protocol between itself and the video devices. This is accomplished by (in addition to allowing one video device to have higher QoS) limiting the rate for all the other video devices in aggregate. By doing this, most often the video devices will actually estimate their share of the limited rate, while once in awhile they will actually estimate the full available upstream rate.

A median filtering at each video device acts to eliminate the estimate of full upstream rate so that the video device can limit its own output rate to a fraction of available bandwidth in a fair manner. Because router 120 itself is also monitoring the video and video feedback traffic for the video device it has given highest priority (and no limit), it can also compute the actual available upstream rate.

Accordingly, router 120 only pays attention to video traffic for the highest priority video device, in order to estimate achievable upstream rate, and have each video device use a median filter to ignore the rate estimate performed when it is the highest priority device and therefore actually estimate a rate based on what router 120 has set as a limit for the non-highest priority video devices.

In one embodiment, router 120 does not explicitly coordinate bit-rate usage using a protocol between router 120 and the various video sources. Instead, router 120 determines a round-robin modulation to promote each of the video devices to a higher QoS setting than the others, as described above. However, video data transmitted from the video devices that are not granted higher QoS are additionally limited to a fair-sharing bandwidth router 120 determines based on its own available upstream rate determination. Router 120 monitors the video traffic and feedback to determine the available upstream bandwidth. As a result, it is not required that video devices 110-112 are coordinate with router 120.

In one embodiment, video devices 110-112 use the IP type-of-service (TOS) bits to identify video data 114-116, respectively, as video class. This is possible because there are more TOS bits than required to implement local QoS. Thus, a new value is used to identify the video devices.

Each video device determines its own operating rate (using existing bit-rate estimation techniques) and therefore do not need to be informed of the bit-rate they should use. This is possible, in part, because router 120 uses the round-robin QoS technique, as described above, and limits the bit-rate on video traffic. However, router 120 performs rate estimation of the available upstream bandwidth.

Methods for Managing Upstream Bandwidth

Figure 2:
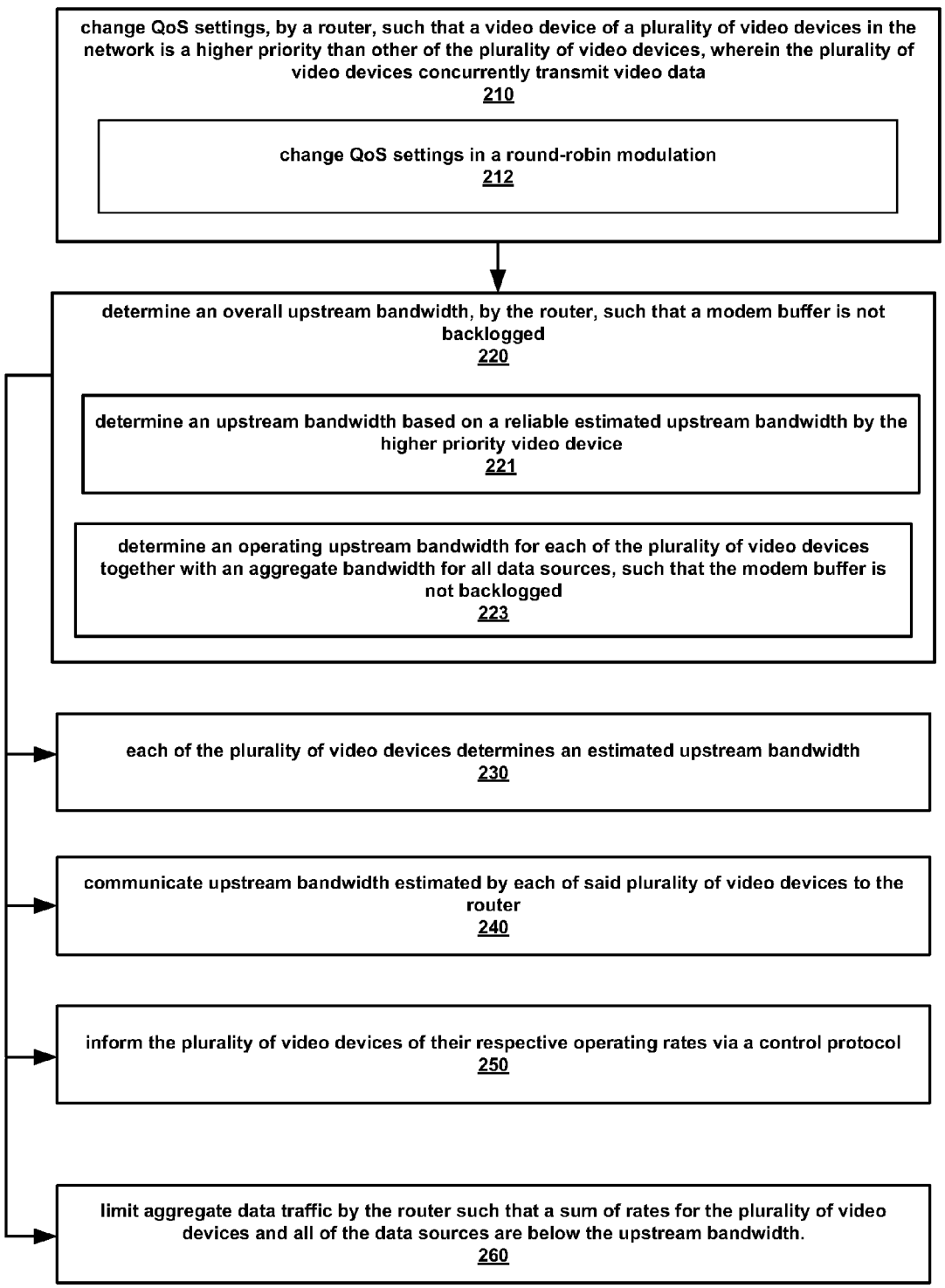
FIG. 2 illustrates an example of a flow chart of a method for managing upstream bandwidth of a network, in accordance with an embodiment of the present invention.
Figure 3:
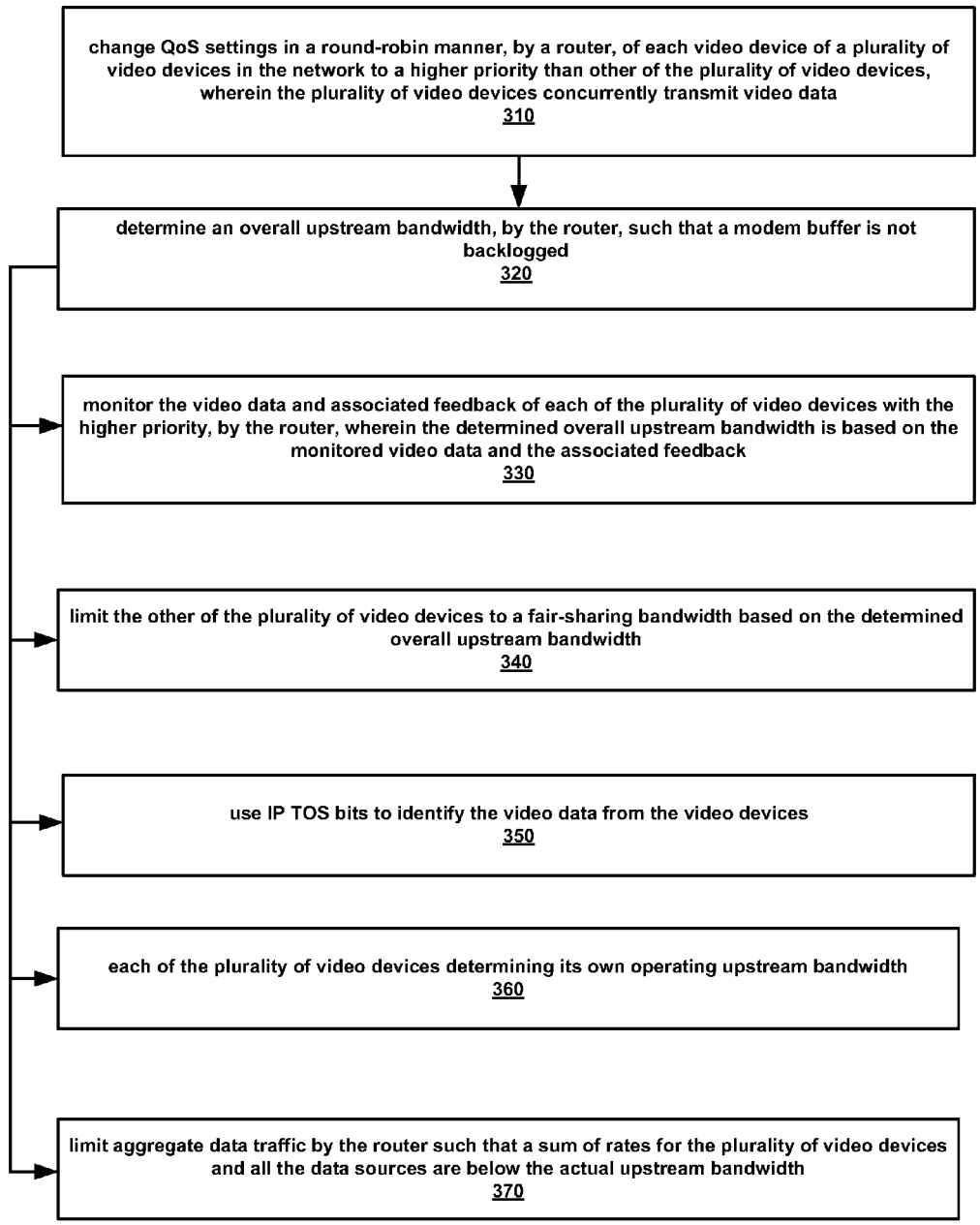
FIG. 3 illustrates an example of a flow chart of a method for managing upstream bandwidth of a network, in accordance with an embodiment of the present invention.

FIGS. 2 and 3 depict methods 200 and 300 for reducing video cross-talk in a visual-collaborative system, in accordance with an embodiment of the present invention. In various embodiments, methods 200 and 300 are carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, methods 200 and 300 are performed at least by network 100 as described in FIG. 1.

At 210 of method 200, QoS settings are changed, by router 120, of a video device (e.g., video device 110) of a plurality of video devices 110-112 in network 100 to a higher priority than other of the plurality of video devices. The video devices 110-112 concurrently transmit video data 114-116, respectively.

In one embodiment, at 212 of method 200, QoS settings are changed in a round-robin modulation. As a result, each video device generates a reliable estimate of the overall upstream bandwidth during the time it has the higher QoS setting.

At 220 of method 200, the router determines operating rates for video and data traffic such that modem buffer 135 is not backlogged. In one embodiment, at 221 of method 200, an upstream bit-rate is estimated based on a reliable estimated upstream bandwidth by the higher priority video device. At 223 of method 200, an operating bit-rate is determined for each of video devices 110-112, together with an aggregate bit-rate for all data sources, such that modem buffer 135 is not backlogged.

At 230 of method 200, each video device 110-112 determines an estimated upstream bandwidth. Note that only the estimate by the video device given highest priority by the router will have a most reliable estimate. At 240 of method 200, the determined upstream bandwidth estimated by each video device 110-112 is communicated to the router 120.

In one embodiment, at 250 of method 200, the video devices are informed of their respective operating rates via the control protocol.

At 260 of method 200, the router 120 limits the aggregate data traffic such that a sum of rates for the plurality of video devices and all of the data sources are below the upstream bandwidth.

At 310 of method 300, QoS settings are changed in a round-robin manner, by router 120, of each video device 110-112 in network 100 to a higher priority than other of the plurality of video devices. The video devices 110-112 concurrently transmit video data 114-116, respectively.

At 320 of method 300, an overall upstream bandwidth is determined, by router 120, such that modem buffer 135 is not backlogged. At 330 of method 300, monitor the video data and associated feedback of each of the plurality of video devices with the higher priority. The determined overall upstream bandwidth is based on the monitored video data and associated feedback.

At 340 of method 300, the other of the plurality of video devices are limited to a fair-sharing bandwidth based on the determined overall upstream bandwidth.

At 350 of method 300, IP TOS bits are used to identify the video data from the video devices. At 360 of method 300, each of the plurality of video devices determine their own operating upstream bandwidth by using a median filter to remove the estimate while being the highest priority video device. At 370 of method 300, the router 120 limits the aggregate data traffic such that a sum of rates for the plurality of video devices and all of the data sources are below the upstream bandwidth.

Various embodiments of the present invention are thus described. While the present invention has been described in particular embodiments, it should be appreciated that the present invention should not be construed as limited by such embodiments, but rather construed according to the following claims.

The invention claimed is:

1. A computer-implemented method for managing upstream bandwidth of a network comprising:
   changing QoS settings, by a router, of a video device of a plurality of video devices in said network to a higher priority than other video devices of said plurality of video devices, wherein said plurality of video devices concurrently transmit video data;
   estimating an overall upstream bandwidth, wherein said estimating is performed by said higher priority video device; and
   determining operating rates, by said router, for said plurality of video devices, such that said modem buffer is not backlogged.

2. The computer-implemented method of claim 1, comprising:
   informing said plurality of video devices of their respective operating rates via a control protocol.

3. The computer-implemented method of claim 1, wherein said determining an overall upstream bandwidth comprises:
   determining an upstream bandwidth for each of said plurality of video devices together with an aggregate bandwidth for all data sources, such that said modem buffer is not backlogged.

4. The computer-implemented method of claim 3, comprising:
   communicating said upstream bandwidth estimated by each of said plurality of video devices to said router.

5. The computer-implemented method of claim 3, wherein said determining an upstream bandwidth comprises:
   determining an upstream bandwidth based on a reliable estimated upstream bandwidth by said higher priority video device.

6. The computer-implemented method of claim 3, wherein said method comprises:
   limiting aggregate data traffic by said router such that a sum of rates for said plurality of video devices and all of said data sources are below said upstream bandwidth.

7. The computer-implemented method of claim 1, wherein said modem buffer is not backlogged by a group consisting of: non-time critical data or video data.

8. The computer-implemented method of claim 1, wherein said changing QoS settings comprises:
   changing QoS settings in a round-robin modulation.

9. The computer-implemented method of claim 1, wherein each of said plurality of video devices determines an estimated upstream bandwidth.

10. A computer-implemented method for managing upstream bandwidth of a network comprising:
    changing QoS settings in a round-robin manner, by a router, of each video device of a plurality of video devices in said network to a higher priority than other video devices of said plurality of video devices, wherein said plurality of video devices concurrently transmit video data; and
    determining an overall upstream bandwidth, by said router, such that a modem buffer is not backlogged.

11. The computer-implemented method of claim 10, comprising:
    monitoring said video data and associated feedback of each of said plurality of video devices with said higher priority, by said router, wherein said determining said overall upstream bandwidth is based on said monitored video data and said associated feedback.

12. The computer-implemented method of claim 10, comprising:
   limiting said other video devices of said plurality of video devices to a fair-sharing bandwidth based on said determined overall upstream bandwidth, 13. The computer-implemented method of claim 10, comprising:
   using IP TOS bits to identify said video data from said video devices.

14. The computer-implemented method of claim 10, comprising:
   each of said plurality of video devices determining its own operating upstream bandwidth by using a median filter to remove an estimate while being a highest priority video device.

15. The computer-implemented method of claim 10, comprising:
   limiting aggregate data traffic by said router such that a sum of rates for said plurality of video devices and all of said data sources are below said upstream bandwidth.

* * * * *